(No Model.)

J. W. GOUSSEN.
MANUFACTURE OF AMBER VARNISH.

No. 311,118. Patented Jan. 20, 1885.

WITNESSES:
L. Holmboe
R. Forsyth

INVENTOR
Johann W. Goussen
BY
Peirce & Fisher
ATTORNEYS

UNITED STATES PATENT OFFICE.

JOHANN WILHELM GOUSSEN, OF CHICAGO, ILLINOIS, ASSIGNOR TO F. H. HERHOLD, OF SAME PLACE.

MANUFACTURE OF AMBER VARNISH.

SPECIFICATION forming part of Letters Patent No. 311,118, dated January 20, 1885.

Application filed April 14, 1884. (No model.)

*To all whom it may concern:*

Be it known that I, JOHANN W. GOUSSEN, residing at Chicago, in the county of Cook and State of Illinois, have invented certain new and useful Improvements in the Process of Making Amber Varnish, of which I do declare the following to be a full, clear, and exact description, reference being had to the accompanying drawings, forming part of this specification.

In the manufacture of amber varnish as at present commonly practiced it is customary to first fuse the amber in a "gum-pot" heated to a very high degree, and subsequently boil it with a proper quantity of linseed-oil, after which it may be thinned or finished, as desired. This method, while producing a very effective article for many purposes, is nevertheless open to the serious objection that the product is always very dark, by reason of the fact that the intense heat of the gum-pot necessary to fuse the amber chars and blackens the portions that come in contact with the sides of the pot; hence the ordinary amber varnish cannot be used where light varnishes are commonly employed.

My present invention has for its object to overcome this objection, and to produce an amber varnish that shall be more effective, and that shall be capable of use in that class of work in which a light varnish is required.

To this end my invention consists, primarily, in fusing amber by ignition, as a preliminary step to its subsequent treatment in the manufacture of varnish.

Figure 1:
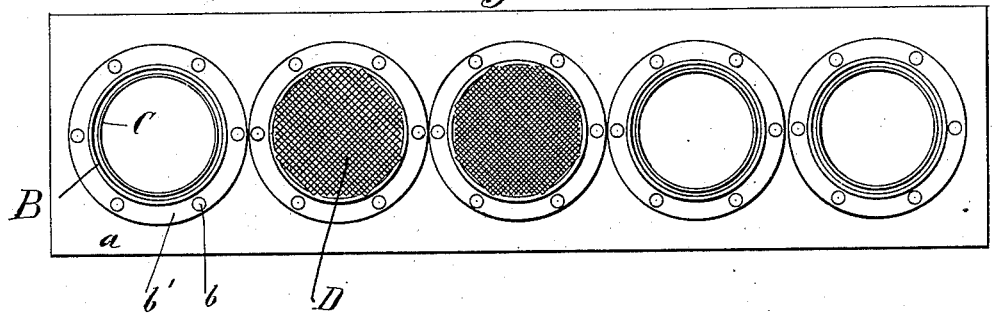
Figure 2:
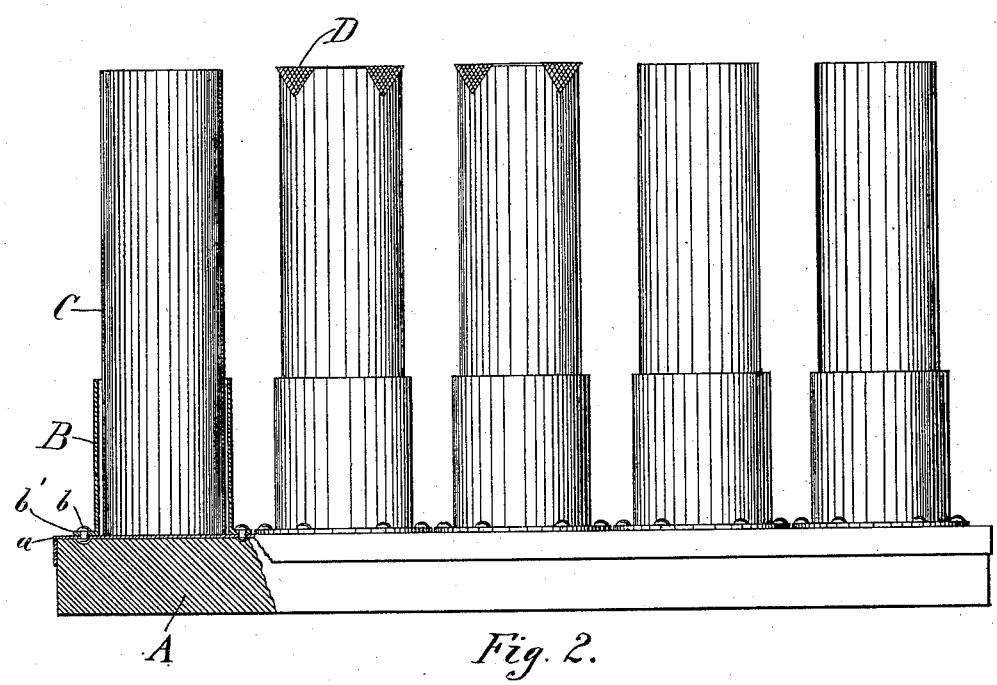

In the accompanying drawings, Figure 1 is a plan view, and Fig. 2 is a view in side elevation, parts being shown in vertical section.

A designates the base-board, the upper surface of which is preferably covered with a sheet-iron plate, *a*. To this plate are connected the stand-pots B by means of the bolts *b*, passing through the flanges *b'*.

Within the stand-pots B fit loosely the drip-pipes C, of suitable height, and over the tops of these pipes will be placed the wire-cloth plates D, upon which the amber will be ignited.

The operation of this apparatus is as follows: Over the top of each of the drip-pipes is fitted a wire-cloth plate, and on each of these plates is placed a quantity of amber, which will be ignited, and during ignition will continue to melt and drip through the meshes of the wire-cloth until the surface of the cloth is bare. Additional masses of amber will then be ignited and fused until each of the stand-pots is filled, when the drip-pipes will be lifted out and can be used in connection with other stand-pipes. It will be understood, of course, that my improved process may be carried out by other suitable means. The amber, deposited in the stand-pots in small lumps, speedily hardens; but I have discovered that by reason of the preliminary fusion by ignition it can afterward be melted in an ordinary kettle at such a comparatively low degree of heat that all danger of charring or blackening the product is avoided. The amber having been collected from the stand-pots will be fused in a kettle, and to it will be added a suitable quantity of linseed-oil in the usual manner. After boiling the oil and the amber together a sufficient time, the product may be thinned, as desired, by turpentine, or otherwise finished. The varnish made with amber that has been fused by ignition will be found to be about the color of boiled oil, and is hence of much brighter appearance than the ordinary amber varnish, and capable of use in a great variety of work for which very dark varnish would be unfit.

Having thus described my invention, what I claim as new, and desire to secure by Letters Patent, is—

1. The step in the manufacture of amber varnish which consists in fusing the amber by ignition, substantially as described.

2. In the manufacture of amber varnish, the method of fusing the amber which consists in igniting it upon a wire-cloth, and allowing it to drip through the cloth, substantially as described.

3. The process of manufacturing amber varnish, which consists in first fusing the amber by ignition, and subsequently boiling it with oil and finishing it in the usual manner, substantially as described.

JOHANN WILHELM GOUSSEN.

Witnesses:
GEO. P. FISHER, Jr.,
JAMES H. PEIRCE.